United States Patent [19]

McNulty

[11] Patent Number: 4,537,225
[45] Date of Patent: Aug. 27, 1985

[54] CONDUIT HAVING WATERPROOF LAYER OF UNIFORM THICKNESS AND METHOD OF MANUFACTURE

[76] Inventor: Frank E. McNulty, R.R. #1 Box 113, Siloam Springs, Ark. 72761

[21] Appl. No.: 516,726

[22] Filed: Jul. 25, 1983

Related U.S. Application Data

[63] Continuation of Ser. No. 288,480, Nov. 16, 1981, abandoned.

[51] Int. Cl.³ .............................................. F16L 9/14
[52] U.S. Cl. ..................................... 138/145; 427/331
[58] Field of Search ............... 138/125, 127, 129, 139, 138/141, 143, 144, 145; 427/331

[56] References Cited

U.S. PATENT DOCUMENTS

| | | | |
|---|---|---|---|
| 2,377,608 | 6/1945 | Bronson | 138/145 X |
| 2,742,931 | 4/1956 | Ganahl | 138/144 X |
| 3,024,153 | 3/1962 | Kennedy | 138/145 X |
| 3,205,913 | 9/1965 | Ehlers | 138/125 |
| 3,498,827 | 3/1970 | Vanderbilt et al. | 138/145 X |
| 3,939,874 | 2/1976 | Gray | 138/145 |
| 4,014,370 | 3/1977 | McNulty | 138/144 |
| 4,192,697 | 3/1980 | Parker et al. | 138/145 X |
| 4,213,486 | 7/1980 | Samour et al. | 138/143 |
| 4,289,172 | 9/1981 | Ekström | 138/145 X |

Primary Examiner—Stephen Marcus
Assistant Examiner—Mark Thronson
Attorney, Agent, or Firm—Arthur McIlroy

[57] ABSTRACT

A wrapped conduit and method of forming it are described in which a layer of hot applied cold flowable waterproofing material of nonuniform thickness is flowed onto a conduit, and over said layer is spirally wrapped under tension a sheet of a nonwoven permeable randomly arranged heat-resistant thermoplastic fibers. An outer or shielding wrap of asbestos felt, plastic film, kraft paper, or the like, is also employed. The product thus obtained has a waterproof layer of essentially uniform thickness which impregnates the sheet of aforesaid fibers.

6 Claims, 3 Drawing Figures

CONDUIT HAVING WATERPROOF LAYER OF UNIFORM THICKNESS AND METHOD OF MANUFACTURE

This is a continuation of application U.S. Ser. No. 288,480, filed Nov. 16, 1981, by Frank E. McNulty for 'Conduit Having Waterproof Layer of Uniform Thickness and Method of Manufacture' and now abandoned.

INTRODUCTION

The present invention relates to a novel protective wrapping material for conduits, such as pipes, cables, and other metal structures, located below ground or under water. More particularly, it is concerned with metal structures that are wrapped by mechanical means.

There are two conventional ways of coating and wrapping oil-and-gas pipelines and water lines which are typical of uses for the present invention. Pipelines are generally coated with a hot applied waterproofing coating, usually coal tar. Asphalt and microcrystalline wax have also been used for this purpose. The waterproofing coatings are susceptible to deformation in the ground, due to soil pressure. For this reason, they are spirally wrapped with various materials to avoid soil-stress damage. Shielding wraps cause thickness variations in the waterproofing coating. Commercially accepted standards for coal tar enamel require that the coating be 1/16" thick minimum, with an average thickness of about 3/32". Frequently, as much as 4/32" is used to obtain a minimum coating thickness of 1/16". My invention is directed to overcoming these variations in coating thickness and improving the application of the waterproofing coating.

BACKGROUND OF THE INVENTION

Pipelines are frequently protected from corrosion below ground using coal tar or asphalt waterproofing coating, as well as microcrystalline wax. Generally, the coat tar or asphalt pitch contain talc or other fillers and are then referred to in the industry as coal tar or asphalt enamels. The application temperature of the hot applied coating material ususally varies between 350° to 500° F., depending upon the composition of the tar or asphalt enamel, ambient temperature, and other variables. A solution primer compatible with the hot applied coating is generally applied ahead of the waterproofing material to improve the adhesion or bond of the coating to the pipe. Hot applied asphalt, or coal tar wax, or wax coatings in the ground not externally mechanically shielded from the backfill will become displaced and distorted owing to soil pressure. Weight of the backfill tends to cold flow the coating on the pipe and displace or remove it from the pipe surface exposing bare metal to the soil. Various mechanical shields are used to minimize this problem. Generally, a 15 pound per square (100 ft$_2$) asbestos felt similar to roofing felt is spirally wrapped as a shielding over hot applied coal tar or asphalt coating to prevent soil stress. Also, polyethylene film has been used as a outer wrap.

Fiberglass mats have been used to reinforce the tar as an inner wrap. They do not level the tar evenly, as they are relatively thick (normally 20 mils) and will not saturate well at the spiral laps. Since they have low tensile strength and are made of very short fibers, the glass mats are reinforced about every ½" with glass threads running parallel to the edge of the wrap. Another disadvantage of the glass mats is that the binders are bulky. For example, a glass mat with a small amount of glass in ounces per hundred square feet contains more binder than glass. This results in bulky rolls that are unwieldy to apply and require a great number of rolls or stops and starts.

A major problem inherent in the application of the hot applied materials is the variation in thickness built up due to the solidification of the hot applied liquid materials on the pipe in irregular surface contours. These varying thicknesses are the result of the mechanical application means used to flow the enamel onto the pipe. It is desirable to obtain a uniform thickness, both from standpoint of material cost and from the standpoint of design for adequate waterproofing protection. Such hot applied coatings of coal tar or ashalt are tyically applied in a thickness of about 3/32", with minimum thicknesses recommended in industry practices of approximately 1/16".

Pipelines are coated by mill application of the coating or by line-travel application. In mill application, the coating is applied soon after the pipe is made. It is later moved to the right-of-way from the coating location for installation with the coating on the pipe when it arrives at the job site. It is necessary to leave about six inches uncoated at each end of the pipe to prevent the heat from the welding operation burning and damaging the coating. This is referred to as a cut-back area on the mill coating. It does require a subsequent field applied coating to be made on each weld, which is approximately every 40 ft. Another disadvantage of mill coating is that there are typically about 30 bends to the mile, and considerable coating repair has to be made if the bends are severe owing the damange of the coating from the field bending. Another method of coating which is practical in some instances, as in rural areas, is to coat the pipe after it is welded. In this method of coating, the pipe is coated and immediately lowered to the ditch ready for back-fill. This eliminates coating the field joints, and there are no bend repairs, as the coating is applied to the pipe after it is bent. This method of coating requires considerable and large equipment on the right-of-way and is impractical to use in congested areas. The coating and wrapping method selected is determined by the location of the pipeline in regard to which coating application procedure is the most practical for the general construction problem.

In either method, the hot enamel as it flows on to the pipe is irregular in its surface and thickness. The material applies like a heavy coat of paint, with runs and sags. The pipe heat sinks and solidifies the enamel. The solidified coating results in a surface having considerable variations in thickness, due to the runs and sags. In the mill application, the pipe is spirally rotated as it is coated and wrapped, and centrifugal force causes ridges and high and low spots in the waterproofing coating when it is in the liquid phase. These tend to solidify into relatively thick and thin areas in the coating. Line travel application of coating also has the disadvantage that the coating on the lower half of the pipe tends to drip and fall off the pipe surface due to its weight. The hot coating needs to be held to the surface and leveled immediately after application before it solidifies and before the mechanical shielding wrap is applied for soil-stress resistance.

Glass fiber mats made of short fibers two or three inches long held together with various binders have been used as an inner wrap for hot coating. They have not been effective with respect to leveling the enamel, because the mats are of irregular surface density which permits the enamel to bleed through certain parts of surface faster than others. Also they have, generally speaking, about every half inch across the width of the mat a glass thread running parallel to the edge of the wrap to give it tensile strength. The binder in the glass mats has no tensile strength at the enamel application temperature, so the glass threads are required. These glass threads have been known to wick water where the coating is damaged, which frequently happens in the lowering-in operations. The wicking of water has caused corrosion, especially where the glass threads might have pulled down through the hot enamel because of improper tension control to the pipe surface. Glass mats have not proved to be dependable as far as achieving a good leveling effect on the hot applied coating, owing to the low tensile strength and varying surface permeability of the glass, as well as its short fiber length.

OBJECTS AND DESCRIPTION OF THE INVENTION

It is an object of this invention to provide an inner wrapping element that can be spirally wrapped while the hot applied waterproofing coating is in the liquid phase, which will provide a waterproof coating of more uniform average thickness using the present means of applying coating by mill or line travel, as described above.

It is a further object of this invention to provide a wrap that has sufficient internal strength under tension and at the application temperature to cause the enamel, while it is still liquid, to flatten irregular surfaces of the enamel.

It is another object of my invention to have an interior wrapping material that will not wick water if the wrap is inadvertently exposed to the backfill, due to tensile damage of the outer wrap and coating.

It is a still further object of this invention to provide a leveling wrap made of thermoplastic essentially non-shrinking spunbonded fibers which have an average thickness of not less than two mils, preferably not more than about six mils, and an air permeability of approximately 160 to 1300 CFM/ft$^2$ on ASTM D-737-69.

My invention is illustrated by reference to the accompanying drawing in which FIG. 1 is an elevational view of pipe having a protective wrapper embodying the features of the present invention;

Figure 1:
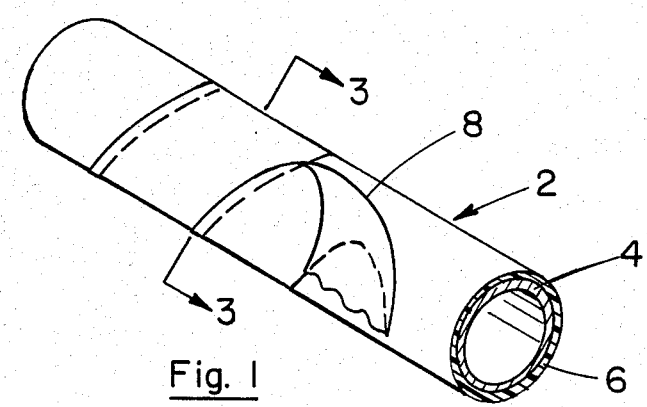
Figure 2:
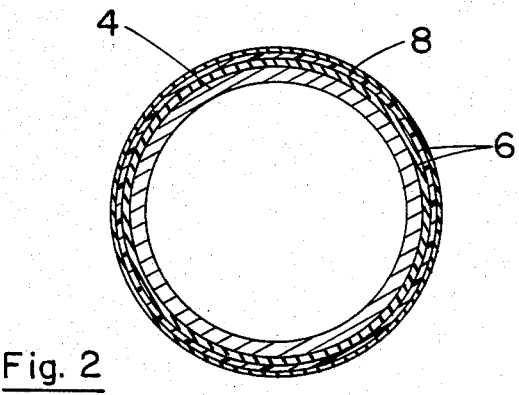
FIG. 2 is a cross-section of pipe shown i FIG. 1, taken along line 3—3, illustrating the relatively even distribution of the waterproofing layer held in position by means of a length of spunbonded shrink resistant thermoplastic fiber.

Referring again to FIG. 1, 2 represents a conduit or pipe wrapped with the protective system of the present invention.

Figure 3:
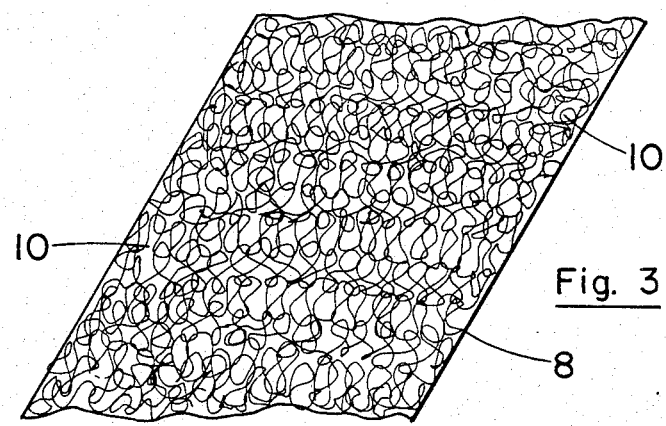
FIG. 3 is an enlarged fragmentary view of the type of spunbonded wrapper used in my invention.

Pipe 4 is covered with a suitable coating material 6, such as coal tar, petroleum wax, or the like. Over the latter is spirally wound in an overlapping fashion, a strip of spunbonded thermoplastic fiber 8. Under tension, the spunbonded wrapper, being of essentially uniform permeability, allows a slight and even penetration of hot coating 6 through the mesh to adhere wrapper 8 to the coating. The structure of wrapper 8 is illustrated in detail in FIG. 3 wherein randomly arranged individual fibers 10 form a surface of substantially uniform permeability.

The wrapping element of the present invention contains nonwoven, continuous, heat-resistant thermoplastic fibers in sheet form, randomly arranged and bonded at the fiber filament junctions. The thermoplastic fiber wrap of this invention should have sufficient resistance to shrink and distortion at the temperature of the coating while it is still a hot liquid. The fiber wrap should be of essentially uniform permeability to allow a slight and even penetration of the hot coating through the mesh to adhere the exterior wrap to the coating. This is the result of uniform surface fiber density or distribution.

The novel wrapping material of this invention typically coprises a thin layer of spunbonded nylon-grade polyamide. An example of such material is known as Cerex, manufactured by the Monsanto Company of St. Louis, Mo. Spunbonded nylon-grade polyamide weighing typically 0.5 to about 2 ounces per square yard has been used satisfactorily for the purposes contemplated by my invention. In the spunbonded polyamide materials, the individual fibers are of considerable length. They are attached to each other by heat fusion at the filament juncture at the time they are manufactured. They contain no foreign biders to hold them together and are randomly arranged. Also, they are unaffected by the application temperature of the hot applied waterproofing coating, such as a bituminous composition, for example, coal tar or asphalt, and they permit such coating to soak in evenly through the relatively uniform surface of the spunbonded fibers. The coating flow through the fibers is controlled by the essentially uniform density or permeability of the fibers and results in a level hot applied coating on the entire pipe surface. This wrap first touches the hot coating at the thicker surface points. The wrap tension flattens and levels the still liquid hot coating, as it permits squeeze-out of air in the low spots. The fiber wrap is slightly imbedded in the outer surface of the hot coating. The filaments are distributed so that they are separate and independent of each other, except at filament cross-over points within the sheet. Since the sheet is formed from continuous filaments, there are essentially no fiber ends within the sheet. The important structural feature of the continuous filament nonwoven sheet structure used in this invention is based on a low degree of filament bunching. The wrap is usually put up in widths from two to eighteen inches and is several thousand feet long for efficient spiral wrapping of the conduit. Once the pipe has been wrapped with the aforesaid continuous filament sheet, it is then overwrapped with a suitable material, such as asbestos felt or polyethylene.

The term "spunbonded nylon-grade polyamide", as used in the present description and claims, is intended to refer to a nonwoven permeable sheet of randomly arranged nylon fibers or other equivalent, such as, for example, preshrunk polypropylene fibers.

From the foregoing description, it is seen that the present invention offers an improvement in the protection of metal conduits that are to be subjected to a corrosive environment. In general, it may be said that my invention is intended to cover any coated conduit and method for making the same wherein a layer of hot applied cold flowable waterproofing material of nonuniform thickness is flowed onto a conduit, after which a sheet of nonwoven permeable randomly arranged heat-resistant thermoplastic fibers is spirally wrapped under tension over said material.

I claim:

1. The method of coating a metal conduit for protection from corrosion in a below ground surface environment which comprises coating said conduit with a layer of hot applied cold flowable waterproofing material of nonuniform thickness and surrounding said layer under tension with an air permeable wrap of heat shrink resistant unwoven continuous spun bonded nylon grade polyamide having essentially no fiber ends within said wrap, said wrap being of substantially uniform thickness and permeability to permit air to expel between the waterproofing material and the wrap leaving said wrap slightly embedded in the outer surface of said material, resulting in a hot applied waterproofing material of substantially uniform average thickness on the surface of said conduit.

2. A coated conduit comprising a metal pipe coated with a layer of hot applied cold flowable water-proofing material of uniform thickness, an inner wrap sheet of unwoven continuous spun bonded heat shrink resistant individual thermoplastic filaments having essentially no fiber ends within said sheet and wrapped under tension in direct contact with said material and around said pipe, said sheet being of substantially uniform permeability whereby said sheet becomes slightly embedded in the outer surface of said coating resulting in a hot applied coating of substantially uniform average thickness on the surface of said conduit.

3. The coated conduit of claim 2 in which said thermoplastic is a nylon grade polyamide.

4. The conduit of claim 3 in which said material is primarily a bituminous composition, said sheet of polyamide weighing from about 0.3–2.0 ounces per square yard.

5. The conduit of claim 3 in which the thickness of said sheet ranges from about 2 to about 6 mils.

6. The conduit of claim 3 in which the air permeability of said sheet ranges from about 160 to about 1,300 CMF/ft square (ASTM D-737-69).

* * * * *